United States Patent [19]

Anderka et al.

[11] 4,074,414

[45] Feb. 21, 1978

[54] PROCESS FOR THE PRODUCTION OF LETTERING OR SYMBOL TEMPLATES

[75] Inventors: Gerold Anderka, Ellerbek; Lasse Kuparinen, Hamburg, both of Germany

[73] Assignee: Koh-I-Noor Rapidograph, Inc., Bloomsbury, N.J.

[21] Appl. No.: 703,876

[22] Filed: July 9, 1976

[30] Foreign Application Priority Data

July 11, 1975 Germany ............................ 2531051

[51] Int. Cl.[2] ...................... B29C 17/02; B29C 17/10; B29C 27/00

[52] U.S. Cl. ........................................ 29/509; 29/515; 264/156; 264/161; 264/249; 264/266; 264/322; 264/331; 264/339

[58] Field of Search ............... 264/154, 161, 162, 155, 264/156, 294, 322, 138, 157, 163, DIG. 34, 249, 266, 271, 331, 339; 29/163.5 R, 432, 432.1, 432.2, 445, 509, 515

[56] References Cited

U.S. PATENT DOCUMENTS

| | | | |
|---|---|---|---|
| 1,999,796 | 4/1935 | Zinzer | 264/161 |
| 2,387,034 | 10/1945 | Milano | 264/322 |
| 2,388,297 | 11/1945 | Slaughter | 264/249 |
| 3,459,350 | 8/1969 | Wahn | 264/161 |
| 3,513,951 | 5/1970 | Leong et al. | 264/249 |

*Primary Examiner*—Willard E. Hoag

*Attorney, Agent, or Firm*—David H. Semmes

[57] ABSTRACT

A process for the production of lettering or symbol templates by production of symbol cut-outs in a template sheet consisting of thermoplastic plastic, characterized by forcing the cut-out portions of the symbols in a shaping or forging step, and subsequently cutting off the protruding forced-out portions.

6 Claims, 3 Drawing Figures

PROCESS FOR THE PRODUCTION OF LETTERING OR SYMBOL TEMPLATES

BACKGROUND OF THE INVENTION

In the case of known processes for making templates, the symbol cut-outs are milled from the template sheet which, to be sure, in the end result leads to high quality precision templates but which requires very time consuming operational steps, so that such templates are expensive and the previously known process is not particularly well suited for mass production.

It has also been known already to mold lettering or symbol templates made of plastic (German OS 1 561 929). This production of the templates by the extrusion process is suitable for mass production, but it requires high quality extrusion molds which are expensive to produce. Additionally, in the case of molding of templates difficulties will arise. On the one hand, the liquid plastic must pass through long paths in the mold at a relatively low thickness of the material. Furthermore, both areas with a relatively large agglomeration of material and areas with a slight agglomeration of material are present. In order to avoid these difficulties, the extrusion molds must be adapted correspondingly, which additionally increases the cost of the molds.

SUMMARY OF THE INVENTION

As compared to prior molding processes, it is an object of the present invention to create a simple process for the production of lettering and symbol templates, one which is suitable, at low cost, both for the production of large and small series of templates.

This object is solved by the present process by the fact that the areas of the cut out portion of the symbols to be produced are forced out from the plane of the thermoplastic material to a distance which is greater than the material thickness of the template sheet. Thereafter, the forced out areas are separated from the template sheet. Preferably, for forcing out of the areas of the cut out portion of the symbols, the template sheet is heated, for example, to a temperature which is up to as high as 10° C below the melting point of the plastic. The separation of the forced out areas takes place after cooling of the plastic.

In the case of the process according to the present invention, one thus starts out with a plate-shaped template sheet which may be separated, for example, from a large available plastic sheet. Thereafter, the areas of the cut out portions of the symbols that are to be produced are forced out of this template sheet. This forcing out can take place an ambient temperature in the case of the plastics used customarily for templates, such as ABS, CAB, polystyrene, polycarbonates, such as "Makrolon", etc. Accordingly, these plastics are then shaped in the manner of cold shaping, or forging, of metals.

Naturally, the forcing out of the areas of the cut out portions of the symbol can take place at a lesser pressure whenever a template sheet of such thermoplastic materials is heated.

The areas forced out of the template sheet can finally be removed without trouble by milling, grinding or by other machining processes, so that cut out portions of the symbols are thus developed, in the template sheet, without any need for an expensive after treatment.

The forcing out of the areas of the cut out portions of the symbols is accomplished, as taught herein, with a corresponding form, which consists of a matrix part and a punch part, between which the template sheet is inserted.

In the case of lettering templates, generally so-called template strips are conventionally provided on the two opposite longitudinal edges. The strips function both to hold the template sheet above the symbol support and serve as stop edges for guiding the template.

According to the process of the present invention, template strips, reaching around the longitudinal edges of the template sheet, may also be pressed onto said mutually opposite longitudinal edges, simultaneously with the forcing out of the areas of the cut out portions of the symbols. By such a pressing on of the template strips, their free edges will penetrate into the template sheet and be fixed in a predetermined position on said template sheet.

Therefore, it is no longer necessary to provide special projections, or grooves, to serve as stops on the template sheet, into which the template strips are to be slipped. Consequently, the additional operational step of slipping in the template strips, after completion of the cut out of the symbol in the template sheet, will be avoided.

The invention will be explained in more detail in the following paragraphs, in which reference is made to the accompanying drawing figures.

DETAILED DESCRIPTION OF THE PREFERRED EMBODIMENT

Figure 1:
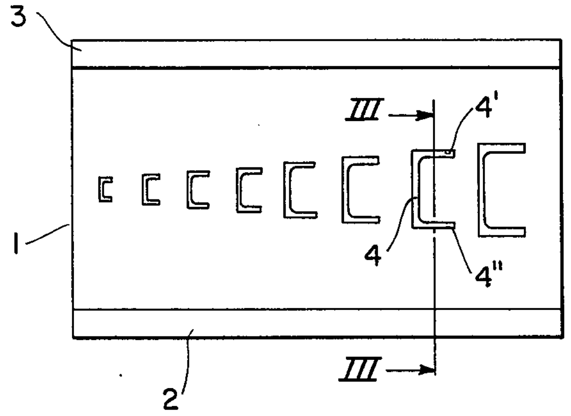
FIG. 1 shows a top view of a symbol template.
Figure 2:
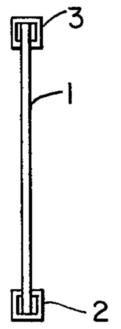
FIG. 2 shows a side view of the symbol template from FIG. 1.

The symbol template shown in the FIGS. 1 and 2, is conventional and consists of a symbol sheet 1 with similar symbol cut-outs, one of which has been designated by 4. On the mutually opposite longitudinal edges of the template sheet 1, template strips 2 and 3 have been attached.

Figure 3:
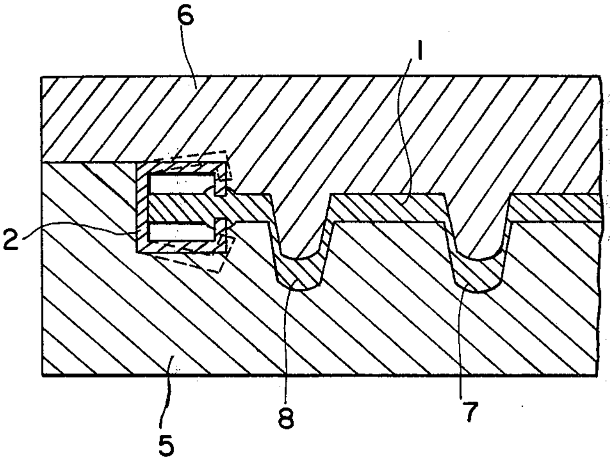
FIG. 3 shows, in a partial schematic illustration, a mold for the production of a symbol template, as in FIGS. 1 and 2, wherein an inserted and shaped template sheet, together with a template strip is produced according to the principles of the present invention.

Production of such a template, as illustrated in FIG. 1, and according to the process of the present invention significantly includes the step illustrated at FIG. 3. A mold consisting of an upper, or punch, part 6 and a lower, or matrix, part 5 is illustrated in FIG. 3. As illustrated, indentations are provided in the lower part 5 and projections in the upper part 6. These parts cooperate to shape part of the plastic sheet in a manner corresponding to the symbol cut-outs that are to be produced.

In the illustration according to FIG. 3, the production of the cut-out area III—III of a template as in FIG. 1 can be seen. Clearly, by pressing together the two form parts 5 and 6, the shaped areas 7 and 8 have been forced out from a template sheet 1, inserted into the mold, by more than the material thickness of the template sheet. As a result, recesses have developed in these areas in the plane of the template sheet 1 which correspond to the areas 4' and 4'' of the symbol cut-out 4 from FIG. 1. It should be noted that the thickness of the material of the connecting areas between the template sheet 1, and the forced out areas 7 and 8, is less than the material thickness of the template sheet 1. Consequently, the ultimate separation of the forced out areas is made easier.

A further and optional feature of the present process is illustrated in FIG. 3. Together with the template sheet 1, template strips are shown inserted into the form, wherein only the template strip 2 has been shown. These prefabricated template strips are known per se. During initial insertion of these strips they are bent up in the manner indicated by a broken line. They are pressed into the template sheet upon pressing together of the form parts 5 and 6, simultaneously with the pressing out of the areas 7 and 8 from the template sheet 1 so that the strips are thereafter held firmly in position. Thus, the putting on the template strips takes place with a very narrow tolerance, determined by the forming elements, and the contact edges formed by the template strips will have a desired precise alignment to the position of the symbol cut-outs.

As has already been mentioned, the forcing out of the areas 7 and 8 can take place without heating the template sheet 1. However, in order to expend lesser pressures, and in order to achieve a shaping as much as possible without resilient return behavior during opening of the form, the template sheet 1 can be shaped in a heated state. For this purpose, it is possible either to heat the template sheet prior to insertion into the form, or the mold parts themselves can be heated to an optimum shaping temperature.

After cooling of the shaped template sheet 1, the forced out areas 7, 8 can be separated from said template sheet. This final separating step can be accomplished by milling, grinding etc., and the desired symbol cut-outs are then finished.

It is quite obviously clear that for the process of the invention, no complicated and expensive types of molds are required, as is the case with the extrusion process. Moreover, one can achieve particularly brief station times, since in the present process a shaping is carried out, between the forms, and unlike the extrusion process, there is no need for the liquid plastic to solidify in a mold.

While one embodiment of this invention has been shown and described, our invention is to be defined by the scope of the appended claims.

We claim:

1. A process for the production of a lettering or symbol template having at least one symbol cut out and at least one template strip on a longitudinal edge thereof, comprising:

A. inserting a sheet of thermoplastic material, together with at least one template strip having free edges positioned to extend around a longitudinal edge of said sheet, between a punch part and a matrix part;

B. penetrating said sheet with said punch, to force at least one portion of said sheet out of the plane of sheet while leaving said portion attached to said sheet by thin connecting areas of connecting material; while simultaneously C. pressing the free edges of said at least one template strip around a longitudinal edge of said sheet so as to penetrate said free edges into said thermoplastic material; and D. separating said at least one forced out portion by severing said thin connecting areas, thereby defining said template.

2. A process as in claim 1 characterized in that template strips are positioned to reach around and are pressed into mutually opposite longitudinal edges of said template sheet.

3. A process as in claim 1, characterized in that the step of forcing out the areas of the symbol cut-outs includes heating the template sheet, and the step of separating the forced out areas takes place after cooling said template sheet.

4. A process as in claim 3 characterized in that template strips are positioned to reach around and are pressed into mutually opposite longitudinal edges of said template sheet.

5. A process as in claim 3, characterized in that the template sheet is heated to a temperature which is up to as high as 10° C below the melting point of said thermoplastic.

6. A process as in claim 5 characterized in that template strips are positioned to reach around and are pressed into mutually opposite longitudinal edges of said template sheet.

* * * * *